United States Patent [19]

Hübner et al.

[11] Patent Number: 4,530,943

[45] Date of Patent: Jul. 23, 1985

[54] PROCESS FOR THE RAPID DISSOLUTION OF WATER-SOLUBLE POLYMERS

[75] Inventors: Wolfgang Hübner, Kempen; Helmut Klein, Krefeld; Erhard Goldacker, Meerbusch; Otto Schroers, Krefeld, all of Fed. Rep. of Germany

[73] Assignee: Chemische Fabrik Stockhausen GmbH, Krefeld, Fed. Rep. of Germany

[21] Appl. No.: 518,510

[22] Filed: Jul. 29, 1983

[30] Foreign Application Priority Data

Aug. 2, 1982 [DE] Fed. Rep. of Germany ...... 3228812

[51] Int. Cl.³ .................... C08J 3/04; C08J 3/06; C08J 3/08
[52] U.S. Cl. .................... 523/318; 523/336; 524/555; 524/916; 524/922
[58] Field of Search ........... 523/336, 337, 339, 318; 524/555, 916, 922

[56] References Cited

U.S. PATENT DOCUMENTS

| Re. 28,474 | 7/1974 | Anderson | 523/336 |
| Re. 28,576 | 10/1975 | Anderson | 523/336 |
| 3,282,874 | 11/1966 | Friedrich | 524/557 |
| 3,284,393 | 11/1966 | Vanderhoff | 526/287 |
| 3,852,234 | 12/1974 | Venema | 523/336 |
| 4,252,706 | 2/1981 | Phillips | 523/336 |

FOREIGN PATENT DOCUMENTS

| 960791 | 1/1975 | Canada | 523/336 |
| 2533108 | 2/1977 | Fed. Rep. of Germany | 523/336 |

*Primary Examiner*—C. Warren Ivy
*Attorney, Agent, or Firm*—Sprung Horn Kramer & Woods

[57] ABSTRACT

A process is disclosed for the rapid dissolution of a water soluble polymer by mixing the polymer with water and using a hydrophilic wetting agent, wherein the water is introduced under normal mixing conditions into a prepared water-in-oil polymer dispersion that is free of wetting agent, the wetting agent being added after dilution of the prepared water-in-oil dispersion with water. It is preferred that the water be added under pressure through a nozzle.

6 Claims, No Drawings

PROCESS FOR THE RAPID DISSOLUTION OF WATER-SOLUBLE POLYMERS

This invention relates to a process for the rapid dissolution of water-soluble polymers.

Water-soluble synthetic or natural polymers are used for a great variety of technical purposes. Of these, their use in the paper industry in the form of highly diluted aqueous solutions for flocculation, sedimentation and auxiliary de-watering agents as well as for retention agents is especially well known.

The production of aqueous solutions of these polymers, proceeding from commercial powdered products, is difficult. When the finely divided powder comes into contact with water, swollen particles result, and this hinders further dissolution, or renders it extremely difficult. Although water-soluble in and of themselves, the solid polymers only disperse poorly in water, and tend to form lumps and agglomerates. In order to hinder the formation of such lumps or agglomerates, or to finally break up agglomerates that have been found, it is necessary to stir intensively, and this requires considerable shearing force. However, shearing forces of such magnitude damage the polymers in that they break down the polymer chains so that the polymers lose their effectiveness, for example, as flocculation agents, either partially or totally.

Attempts have already been made to dissolve such polymer powders by indirect methods. Thus, in U.S. Pat. No. 3,282,874 the polymer powders are first dispersed in an organic phase that is not soluble in water and then this dispersion is processed into a water-in-oil emulsion. This emulsion separates into an organic phase and an aqueous phase, which contains an aqueous polymer gel. However, this gel, too, can only be processed into a diluted polymer solution by intensive stirring, i.e. by the application of shear forces that damage the polymers. The process used to produce the diluted polymer solutions is complex quite apart from this.

In German Pat. No. 2,154,081 rapid dissolution of the polymers without the use of intensive and/or lengthy stirring is achieved in that a water-in-oil emulsion of the polymers of a specific molecular weight of over one million and of a specific size between 5 nm and 5 $\mu$m produced by emulsion polymerization of the corresponding monomers, is poured into water in the presence of a hydrophilic wetting agent such that the water-in-oil emulsion is converted to an oil-in-water emulsion.

After the water-in-oil emulsion of the polymers has been stirred into the prepared water the aqueous polymer solutions still require a specific maturation time in order to reach their optimal effectiveness for technical applications. The procedure described in German Pat. No. 2,154,081 is based on the application of the known phase inversion in the presence of a wetting agent to known water-in-oil polymer emulsions, which, for example, can be obtained by the polymerization process described in U.S. Pat. No. 3,284,393. It is also important that for the dissolution process according to German Pat. No. 2,154,081 the polymer emulsion be added to the water (and not the reverse), as is also the presence of a wetting agent when the polymer emulsion is added to the water. It is only when both these conditions are met that the desired rapid dissolution will be achieved. If the reverse procedure is followed, and water is added to the water-in-oil emulsion of the polymers, a highly viscous, gel-like solution will be obtained that is extremely difficult to dissolve even if additional water is added. This has to be stirred intensively for a long period in order for dissolution to occur. Only infrequently does one achieve rapid dissolution if the polymer emulsion is added to the water without the presence of a wetting agent. In technically conventional plants, in which large quantities of emulsions of high molecular weight polymers have to be brought into solution, it is disadvantageous that—because of the presence of the wetting agent—the phase inversion of the emulsion can take place prior to the necessary even distribution of the viscous polymer emulsion in the solvent water, which leads to heterogeneities because of the formation of lumps in the solution, whereupon these fractions only go into solution after a long delay.

It has now been found that contrary to the disclosures of German Pat. No. 2,154,081 it is possible to achieve optimally effective aqueous solutions of polymers if water is added to a prepared water-in-oil emulsion of the polymer or to a suspension of the polymer powder in a hydrophobic phase and the hydrophilic wetting agent is added only after dilution of the emulsion or suspension, respectively.

For this reason the mode of operation according to the invention is not obvious, since it is technically difficult to add a comparatively large quantity of water as rapidly as possible to a comparatively small quantity of polymer emulsion or suspension. Using the mode of operation according to the invention it is possible—in a far shorter time then was heretofore possible—to achieve solutions that are ready for use, particularly of high molecular weight water-soluble polymers that require practically no maturation time to develop their optimal characteristics for technical application.

The water is best added at a pressure of at least 4 bar. The mixing of the water into the polymer emulsion can be effected by stirring or by jets. In this connection it has proved to be particularly advantageous to inject the water tangentially to the surface of the prepared polymer since this results in particularly good mixing.

For purposes of the invention water-soluble synthetic or natural products are suitable as the polymers, for example, polymers and copolymers of acrylic acid, acrylamides, methacrylic acid, methacrylamides, vinylpyrrolidone, acrolein, quaternary ammonium salts that contain vinyl groups, as well as natural rubbers. Such products are available as either powders or water-in-oil emulsions.

Known products are also suitable as the hydrophilic wetting agents that convert the water-in-oil emulsion or the suspension of the polymer powder in oil to an oil-in-water emulsion. The wetting agent that is used is hydrophilic and water-soluble. It is used in quantities of from 0.01 to 20% in relation to the polymer, and, for all practical purposes, quantities of wetting agent from 1.0 to 10% are sufficient.

The following can be used as wetting agents: oxethylated alkylphenols, e.g. nonylphenol-9-EO, sodium or potassium soaps of the higher fatty acids, fatty alcohol sulfates, alkylsulfonates, alkylarylsulfonates, sulfated and sulfonated oils, e.g. sulfated castor oil, etc.

The wetting agent can be added either at the conclusion of the addition of water or shortly before this, either separately or together with the water that is added in a jet, as well as by incremental quantities.

The present invention is described in greater detail by the following examples.

EXAMPLE 1

19.4 g of an anionic E-polymer (65 mol-% acrylamide, 35 mol-% sodium acrylate, polymer portion 25%) were placed in a 2 l beaker.

800 g of water were added to the product and on stirring a milky turbid liquid resulted. The viscosity of this liquid was 1120 mPa.s (Brookfield viscosity, 20 deg.C.). During continued stirring 2 g nonylphenol-9-EO and finally 178.6 g of water were added to the liquid. The polymer contained in the liquid dissolved rapidly with a marked increase in the viscosity of the liquid. The 0.5% polymer solution had a viscosity of 6600 mPa.s. The flocculation test that was carried out subsequently on an aqueous clay suspension (18 g blue Witterschlick clay/l) resulted in a flocculation time of 4 seconds on the addition of 1 ppm of the polymer.

EXAMPLE 2

A 4 $m^3$ dissolving tank with a stirring mechanism was charged with 38.86 kg of a cationically effective emulsified polymer, polymer content 38.6%, proportion of cationic monomers 70%-wt. Subsequently, 2000 l of water were added to the emulsified polymer from above. A milky, turbid liquid with a viscosity of 5 mPa.s formed. Finally, 4.0 kg nonylphenol-9-EO and 957 l of water were added to the liquid. This resulted in a 0.5% homogenous solution of the polymer. The viscosity of the liquid was 1160 mPa.s.

EXAMPLE 3

2.33 kg of a cationically effective emulsified polymer with a 38.6% polymer content, which contained a proportion of 70%-wt of cationic monomer groups, were placed in a 0.5 $m^3$ dissolving tank. A total of 295.4 l of solvent water were added from above through a fall pipe, at a pressure of 18 bar, from 4 nozzles, these being arranged 25 cm above the bottom of the tank on a circular water pipe, tangentially to the surface of the liquid. This arrangement provided for particularly good mixing of the components during the addition of the water. After the addition of 150 l solvent water, 2.4 kg nonylphenol-9-EO was added to the remainder of the water as a wetting agent.

Some 2 minutes after the start of the test a 0.3% homogenous polymer solution, viscosity 390 mPa.s formed. The solution displayed a flocculation value of 5 seconds on the addition of 2 ppm polymer.

We claim:

1. In the dissolution of a water soluble polymer by mixing the polymer with water and a hydrophilic wetting agent, the improvement which comprises adding water as jets or with stirring to effect mixing, to a water-in-oil emulsion of the polymer or to a dispersion of the solid polymer in oil, the dispersion or emulsion being free of the hydrophilic wetting agent, and thereafter adding the wetting agent to the dispersion or emulsion, thereby effecting phase inversion and rapid dissolution of the polymer.

2. A process according to claim 1, wherein the water is added to a pressure of at least 2 bar absolute.

3. A process according to claim 1, wherein the water is added by means of a nozzle.

4. A process according to claim 1, wherein the water is added tangentially to the surface of the dispersion or emulsion.

5. A process according to claim 1, wherein the wetting agent is added under pressure.

6. A process according to claim 3, wherein the water is added tangentially to the surface of the dispersion or emulsion at a pressure of 15 to 80 bar absolute and the wetting agent is added under pressure.

* * * * *